United States Patent [19]

Beck

[11] Patent Number: 5,052,346
[45] Date of Patent: Oct. 1, 1991

[54] WATER HEATER FOAM DAM AND FORMING METHOD

[75] Inventor: David Beck, Middleville, Mich.

[73] Assignee: Bradford-White Corporation, Philadelphia, Pa.

[21] Appl. No.: 640,634

[22] Filed: Jan. 14, 1991

[51] Int. Cl.⁵ ............................................. F22B 37/36
[52] U.S. Cl. .............................. 122/494; 29/890.051; 122/13.1; 124/361; 264/46.5; 264/46.7; 264/46.9; 392/441
[58] Field of Search ..................... 122/13.1, 494, 18; 219/312; 264/46.9, 46.7, 46.5, 46.2; 126/361; 220/444; 29/890.051

[56] References Cited

U.S. PATENT DOCUMENTS

| | | | |
|---|---|---|---|
| 4,372,028 | 2/1983 | Clark et al. | 264/46.9 X |
| 4,447,377 | 5/1984 | Denton | 264/45.2 |
| 4,628,184 | 12/1986 | West | 219/312 |
| 4,861,968 | 8/1989 | West | 219/312 |
| 5,005,531 | 4/1991 | Helson | 122/494 |

Primary Examiner—Edward G. Favors
Attorney, Agent, or Firm—Austin R. Miller

[57] ABSTRACT

A water heater is made by shielding the space between a tank and a jacket, which space is intended to include a control apparatus accessible from outside the jacket, by making and installing an insulating dam provided of flexible, deformable insulating material, removing corner position from the dam, slitting the block lengthwise with a slit which is surrounded by the block, thereby forming connected body portions, moving the body portions apart from each other, thereby forming an open frame, turning the resulting open frame inside out to form a foam dam, inserting the resulting foam dam around the control apparatus, placing the jacket over the dam and introducing liquid foam forming material into the space between the tank and the jacket.

8 Claims, 4 Drawing Sheets

WATER HEATER FOAM DAM AND FORMING METHOD

This invention relates to a method of providing foam insulation for a water heater of the type having a tank and an outer jacket defining an annular space therebetween.

It has been found to be commercially advantageous to fill the annular space with flowable foam forming material to provide highly efficient insulation between the tank and the jacket.

An important problem has arisen, especially in making water heaters provided with electrical or other control devices which are mounted on the side of the tank and positioned in the space between the tank and the jacket. The introduction of flowable foam forming material into the annular space between the tank and the jacket needs to be restricted to protect the control devices from contact with the foam. Otherwise, the action of the foam can interfere with the effective operation of the control devices. Also the control devices should not be covered with foam because they should be left available for inspection and possible adjustment during the life of the water heater.

The problem of protecting control elements from foam forming materials has already been addressed in the U.S. Pat. No. 4,632,792, to Clark granted Dec. 30, 1986, and in U.S. Pat. No. 4,808,356, granted Feb. 28, 1989, to Bradford-White Corporation. The objectives of these patents are to provide protection so that the foam forming materials may expand into the annular space between the tank and the jacket without expanding into unwanted places including the interiors of the control devices or covering or contaminating the operating mechanisms of the control devices, resulting in their becoming inoperative.

In the aforesaid U.S. Pat. No. 4,808,356 a foaming apron is provided having inner and outer flexible sheets, and fluid foam is introduced between the sheets. The sheets are connected to one another to provide sealed cut-out portions arranged to protect the control mechanisms. This has been a commercially effective way of introducing foam forming materials between the tank and the jacket, and the sealed connections between the flexible sheets have been effective in restricting the flow of the foam forming materials, and in protecting the control elements.

It is also known, as disclosed in the patent to Nelson U.S. Pat. No. 4,744,488, granted May 17, 1988, to provide an insulating collar device made of a multiplicity of layers of material, including inner and outer soft and compressible flexible urethane foam layers surrounding a middle layer made of a rigid material such as wood or the like. In the Nelson disclosure the thickness of the collar is greater than the width of the annular space between the tank and the jacket of the water heater and the collar is shaped so that its configuration matches the peripheral configuration of the control apparatus, and is sized to receive and fit closely around the perimeter of the control apparatus, either with a slip fit or, more particularly, a press fit. Of course, in such an arrangement it is necessary to provide and stockpile a different protective collar of specific size and shape for each different tank and for each different size and shape of control apparatus.

OBJECTS OF THE INVENTION

It is an object to this invention to provide a method of making a water heater and for insulating it with a flowable foam forming material, without the need to use restraining sheets or aprons, and with the use of a flexible, compressible foam dam which is adaptable to a wide variety of shapes and sizes of water heaters and control elements.

Still another object of the invention is to provide a method of insulating a water heater on a production line basis with high efficiency and excellent adaptability.

Still another object of this invention is to provide such a method, wherein a foam dam is utilized with effectiveness and efficiency in conjunction with a variety of sizes and shapes of water heaters, tanks, jackets and control elements, without requiring special sizing or configuration.

Still another object of this invention is to provide a method of insulating a water heater utilizing a flexible and compressible foam dam which is very inexpensively made from ordinary pieces of foam material.

Other objects and advantages of this invention, including the simplicity and economy of the same, and the ease with which it may be adapted to a wide variety of production techniques, will further become apparent hereinafter, and in the drawings of which:

DRAWINGS

DETAILED DESCRIPTION OF THE PREFERRED EMBODIMENT

Figure 1:
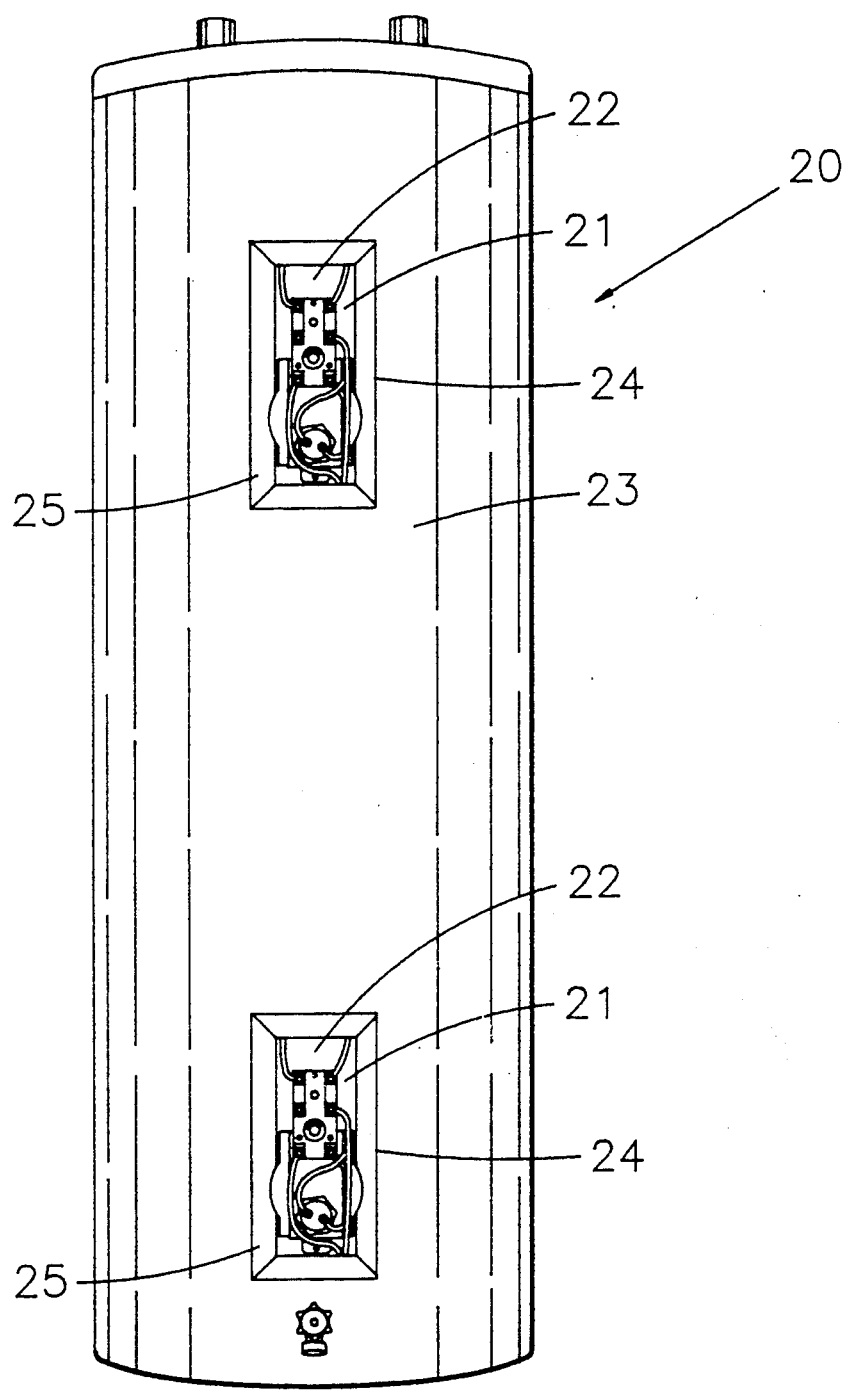
FIG. 1 is a face view of a water heater embodying features of this invention.

Turning now to the drawings, FIG. 1 shows a water heater 20 having inlet and outlet pipes at its top for incoming and heated water, and having control elements 21,21 secured to the water tank 22, only a small portion of which is visible in FIG. 1. The number 23 designates the jacket, which is spaced outwardly from the water tank 22 to provide an intervening annular space which is, during the manufacturing process, insulated by the introduction of liquid foam forming materials between the tank and the jacket. The jacket 23 is provided with cut-away portions 24,24 providing openings for access to the control elements 21,21. The numbers 25,25 designate dams which are interposed between the tank 22 and the jacket 23, in the area of the cut-away portions 24,24, to protect the control elements 21,21 against the influence of flowable foam forming materials.

Figure 2:
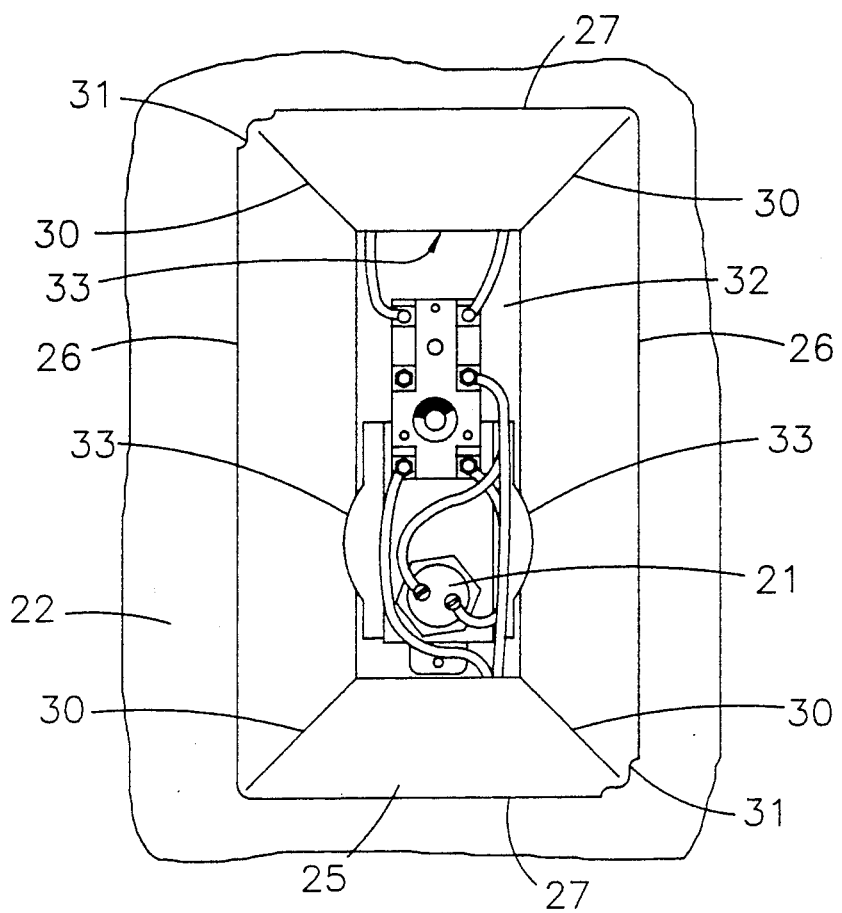
FIG. 2 is an enlarged view illustrating a portion of a water heater tank, with the jacket removed, showing an important step in the method of this invention.

Turning to FIG. 2 of the drawings, the particular form of foam dam 25 there shown comprises a flexible, deformable dam of insulating material in the form of a substantially rectangular block having side walls 26,26 and end walls 27,27 and having the general configuration of a picture frame, wherein the adjacent side and end walls are separated from each other in the corners of the frame by a plurality of diagonally arranged slits 30 which extend almost to, but not quite to, the peripheral edges 26,26 and 27,27, each of which terminates in a small hole 31. The presence of the slits 30 and holes 31 allows the dam 25, which is made of flexible, deformable insulating material, to be deformed to a wide variety of angles other than right angles as regards the relationships of the side walls 26 and the end walls 27. Further, it will be observed in FIG. 2 that the inner open area 32 of the dam 25 has a dimension considerably smaller than at least one dimension of the control element 21, and that due to their flexibility the inner walls 33,33 of the side and end walls of the dam 25 may be deformed outwardly quite readily in order to expand the dam 25 to encompass the exterior periphery of the control element 21. Because of its flexibility and elasticity the dam 25 can be readily and tightly fitted to the control element 21 and held in place by its own resiliency.

Figure 3:
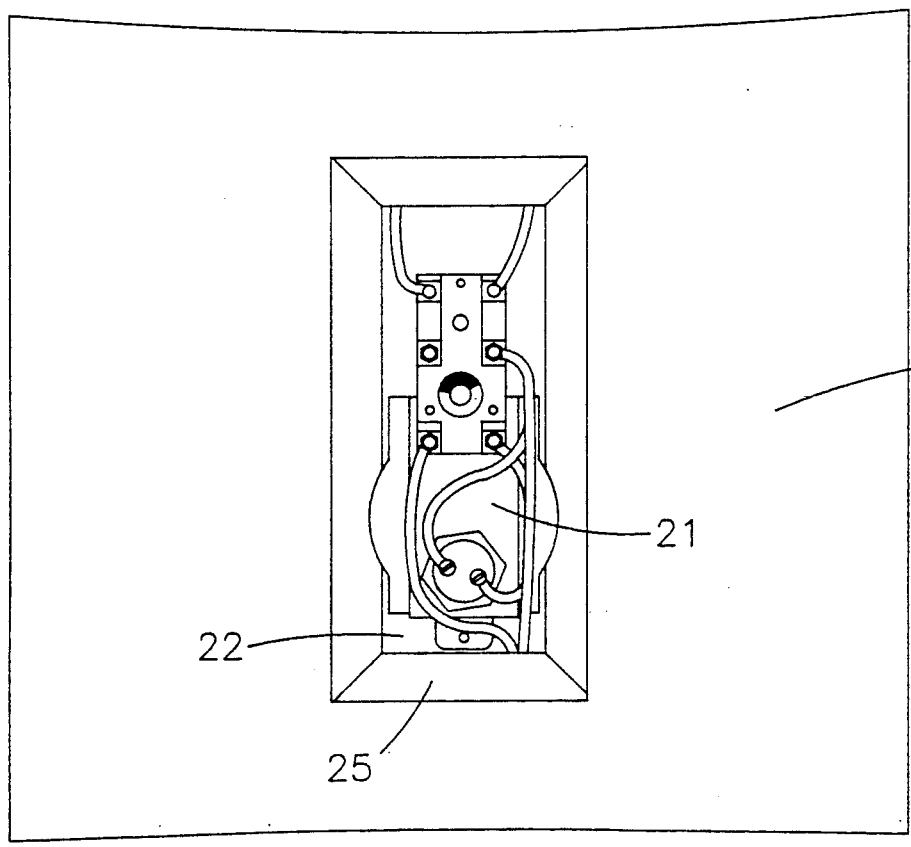
FIG. 3 is a view similar to FIG. 2, showing the step wherein the outer jacket is applied over the foam dam in accordance with a step of the method of this invention.

FIG. 3 shows the dam 25 in place, with the jacket 23 covering a substantial portion of the dam 25, and with the dam 25 compressed against the water tank 22 by the jacket 23 and resiliently surrounding the control element 21.

Figure 4:
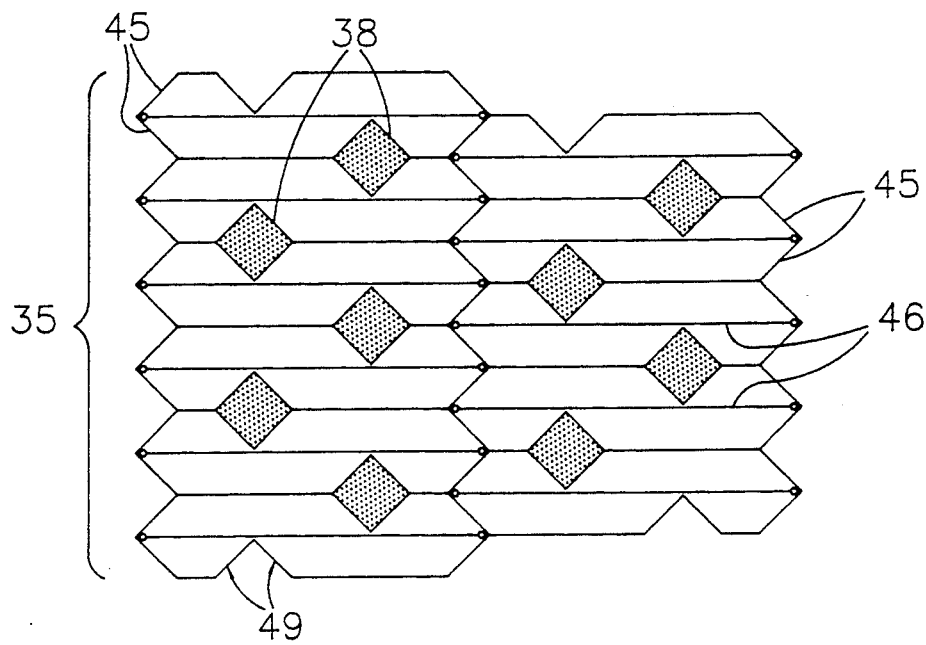
FIG. 4 is a face view of a large sheet of foam of a type suitable for forming a multiplicity of foam dams in accordance with this invention.

FIG. 4 of the drawings shows a large sheet of foam in the form of a piece 35 of flexible, deformable insulating material capable of being die cut to produce a multiplicity of individual foam dams, each having angular end portions removed to provide angular end edges 45. Each piece 35 also has side edges 36. Cut-out portions 38 may be formed and removed in a single die-cutting operation for a reason and purpose to be explained in further detail hereinafter.

FIG. 4 shows the ability of the die-cut pieces 35 to be nested with each other even after die cutting, which is of importance in storing, shipping and handling. Further, the individual foam pieces 35 can readily be separated manually from each other for installation into successive water heaters on the assembly line.

The die-cutting operation desirably simultaneously removes triangular portions from corners of each die-cut piece 35, presenting four angular end faces 45, for discard along with pieces 38 or for other uses.

Figure 5:
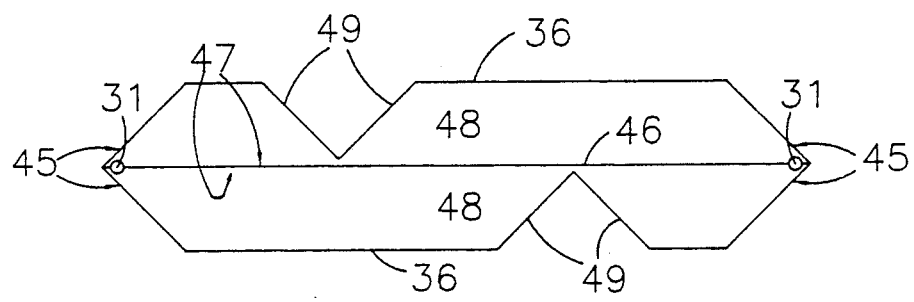
FIGS. 5-8 are views showing successive steps applied to the foam in order to create a foaming dam in accordance with this invention.

FIGS. 4 and 5 show slits 46 cut (preferably in the die-cutting operation) longitudinally to form two foam body portions 48,48 having opposed slit surfaces 47,47 extending almost but not quite the length of the piece 35. Preferably, at each closed end of the slit 46, are holes 31 which may be drilled or otherwise formed through the thickness of the foam.

FIG. 5 shows the removal of triangular portions, one from each side edge 36 of the block, preferably also by die-cutting, providing a pair of triangular cut-out areas in the side edges 36,36 and spaced inwardly from their ends. This provides pairs of v-shaped surfaces 49,49 on each of the foam body portions 48.

Figure 6:
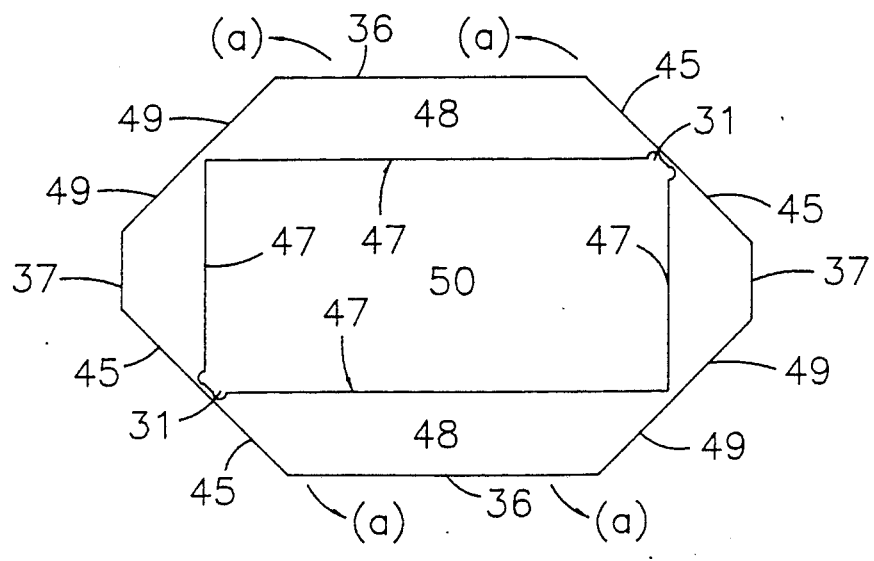

Referring to FIG. 6, it will be appreciated that in view of the novel construction achieved in FIG. 5, especially with the provision of the cut-out surfaces 49, it is possible to separate the two body portions of the block which are located on opposite side of the slit 46. This is readily done by swinging them around the holes 31 as pivots, by moving the body portions 48,48 apart in the manner indicated by the arrows (a) appearing in FIG. 7. In effecting this movement the respective walls 45,45 and 49,49 pivot and substantially align themselves with each other around the drill holes 31. Concurrently, the opening movement partially opens up the holes 31 and provides an open area 50 as shown in FIG. 8 within the frame of flexible, deformable insulating material. As shown, combined surfaces 45,45 form two outer corners of the resulting open frame structure (upper right and lower left) while combined surfaces 49,49 form two other corners (upper left and lower right). Further, the opening movement (a) converts the slitted surfaces 47,47 into four inner side walls of the resulting framework—two side walls and two end walls.

Because of the flexibility and deformability of the insulating material, assisted by the holes 31, it will now be appreciated that it is possible to twist the structure of FIG. 6 or turn it inside out, as by twisting the end portions 37,37 and the side portions 36,36 upwardly away from the plane of the paper and rotating each one of those portions through approximately 180° until all of the outside surfaces 45,45, 49,49, 37,37 and 36,36 become inside surfaces arranged internally of the frame. Concurrently, slitted surfaces 47,47 forming the inside side and end walls of the space 50 become locked in position as the side walls 26 and end walls 27 of the final frame or dam as shown in FIG. 8 of the drawings. The slitted surfaces 45 of the v-shaped notches of FIG. 5 become the slits 30 of the final frame or dam of FIG. 8 (see also FIG. 2).

Figure 7:
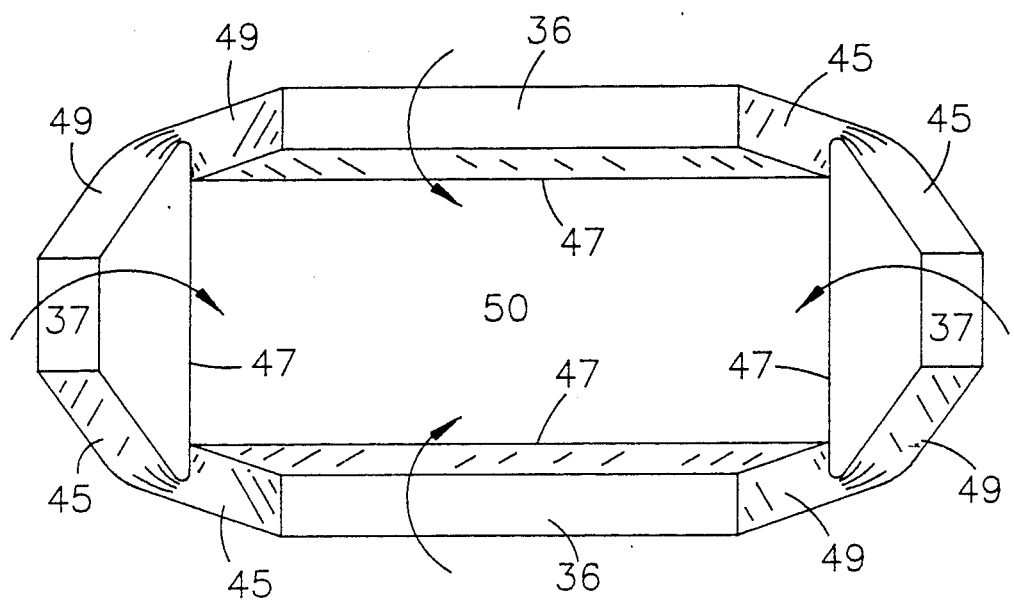
Figure 8:
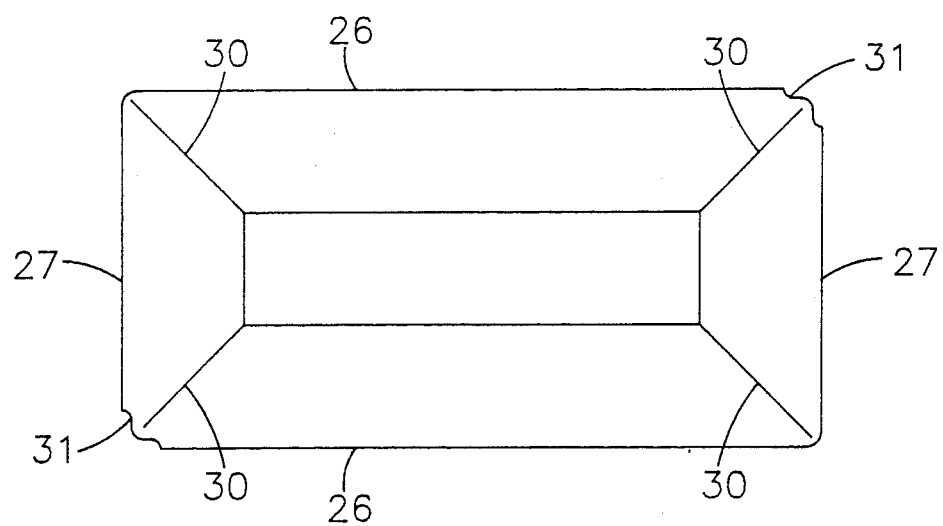

FIG. 7 is a view in perspective showing the frame twisted partly inside out, and FIG. 8 shows the completed frame, providing a flexible deformable dam of insulating material which is highly useful in the method of this invention.

It will now become apparent that the method of making the water heater includes the steps of providing a tank and an outer jacket defining an annular space therebetween, which space is adapted to be filled with flowable foam forming material to provide insulation between the tank and the jacket. The tank 22,22, as shown in the drawings, includes at least one control element 21 accessible from outside the jacket 23 and shielded from the flow and expansion of the foam forming materials by the insulating dam 25. In accordance with the method of this invention, in addition to providing a flexible deformable dam having a thickness of at least the width of the annular space, which dam is expandable around the control apparatus, it is highly advantageous to expand the foam dam and apply the expanded foam dam by friction to the control apparatus. This greatly expedites the production line procedure, assures uniformity of product, and facilitates the subsequent step of positioning the jacket over the foam dam and over the control apparatus, in such a manner that each aperture in the jacket comes substantially into registry with the corresponding control element and at least a portion of the foam dam surrounding it. In this manner, the foam dam is packed resiliently, elastically and tightly between the tank and the jacket, reliably protecting the control element from the foam forming materials which are introduced into the space between the tank and the jacket.

Using the method of this invention, it is highly advantageous to mass-produce a multiplicity of water heaters without using any foaming apron of the type referred to in U.S. Pat. No. 4,808,356 or other special films or sheets, and without the production line complications associated with the manufacture, alignment, insertion and use of such foaming aprons. Additionally, the flexible elastic foam dam produced by the method in accordance with this invention lends itself admirably to mass production, is very inexpensive to make, is economical of foam material, and is easy to set up and install on the water heaters on a production line basis. Other advantages, as well, will readily become apparent.

Although this invention has been disclosed with respect to specific forms and specific method steps, it will be appreciated that the order of the method steps may be varied in many ways. For example, the provision of holes as shown in FIG. 5 in some cases be omitted, or if used can be reversed in sequence with the removal of corner portions as shown in FIGS. 4 and 5. Similarly, the removal of angular body portions to produce edges 49,49 as shown in FIGS. 4 and 5 may precede any of these steps, or any one of them, and the shapes, configurations and sizes of the cutting lines for removed corner portions and body portions 38 and resulting surfaces 45 and 49 in FIG. 6 and 30 in FIGS. 2 and 8 may be varied depending upon design considerations.

In like manner the shape, configuration and size of the slit 46 may be varied in many ways to custom design the resulting shapes of the side walls 26 and end walls 27 of the dam 25 (FIGS. 2 and 8).

It will be appreciated further that although FIG. 6 shows the side walls 36,36 opened up to a completely separated configuration the step of twisting the framework inside out as shown in FIG. 7 can often be accomplished effectively and efficiently without completely opening up the framework to the full degree. Other revisions and modifications may be resorted to as well.

The invention is, of course, not limited to the use of one dam or to any particular number of dams per control element, depending upon the particular configuration of the water heater and the number, size and shape of electrical or other control units mounted thereon. Further, this invention is not limited to electrically energized water heaters since its structures, principles and method steps can well apply to gas-energized water heaters and to water heaters using other energy sources. Indeed, the invention applies to the protection of any component whether mounted on the water tank or not, which component requires protection from the liquid foam forming material or materials introduced into the space desired t be insulated.

It will further be appreciated that many other variations may be made within the spirit and scope of this invention, including the use of foam blocks 35 of various shapes other than rectangular, the substitution of equivalent elements and method steps for those particularly shown or described, the revision or reversal of the sequence of steps of the method, and the use of certain features of the invention independently of other features. All such changes may be made without departing from the spirit and scope of this invention, which is defined in the appended claims.

The following is claimed:

1. In a method of making a water heater having a tank and an outer jacket defining an annular space therebetween, which space is adapted to be filled with flowable foam forming material to provide insulation between the tank and the jacket, said tank including at least one control element accessible from outside said jacket and shielded from foam forming material by an insulating dam, the steps which comprise:

(a) providing a flexible deformable foam dam having a thickness of at least the width of said annular space, which dam is expandable around said control element;
(b) expanding the foam dam and applying the expanded foam dam by friction to the control element; and
(c) positioning the jacket over the foam dam and control element.

2. In a method of making a water heater having a tank and an outer jacket defining an annular space therebetween, which space is adapted to be filled with flowable foam forming material to provide insulation between the tank and the jacket, said tank including at least one control element accessible from outside said jacket and shielded from said foam forming material by an insulating dam, the steps which comprise:

(a) providing a flexible, deformable piece of insulating material;
(b) removing corner portions from said piece;
(c) slitting said piece with an internal slit which is surrounded by the piece, thereby forming said piece into connected body portions;
(d) moving apart from each other the body portions formed by said slit, thereby forming an open frame;
(e) turning the resulting open frame inside out to form a foam dam;
(f) inserting the resulting foam dam into the space surrounding said control element; and
(g) introducing liquid foam forming material into the space between the tank and the jacket.

3. The method defined in claim 2 wherein said dam has a thickness slightly greater than the width of said annular space.

4. The method defined in claim 3, including the further step of removing angular portions from opposed faces of said piece at locations spaced inwardly of the ends of said piece.

5. In a water heater having a tank and an outer jacket defining an annular space therebetween, which space contains at least one control element, the combination which comprises:

shielding means in the form of a flexible deformable foam dam surrounding said control element and compressed between said tank and said jacket said dam having a thickness when relaxed that is greater than the width of said annular space, and said dam being expanded around said control element; and
poured insulating foam distributed throughout said annular space but shielded by said dam from said poured insulating foam.

6. The water heater defined in claim 5 wherein said dam comprises a frame having a plurality of side walls and end walls and an open inner portion that in at least one dimension when relaxed is smaller than a corresponding dimension of said control element but has sufficient elasticity for stretching said frame over said control element.

7. The water heater defined in claim 6 wherein the side walls and end walls have angled surfaces contacting each other.

8. The water heater defined in claim 6 wherein said frame has a plurality of corners and wherein relief openings are positioned at the inner corners of said frame.

* * * * *